United States Patent
Kreitzer

(10) Patent No.: US 8,209,160 B2
(45) Date of Patent: Jun. 26, 2012

(54) DEVICES, SYSTEMS, AND METHODS FOR DESIGNING A MOTOR

(75) Inventor: Scott Kreitzer, Maineville, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 843 days.

(21) Appl. No.: 11/944,975

(22) Filed: Nov. 26, 2007

(65) Prior Publication Data
US 2008/0270093 A1 Oct. 30, 2008

Related U.S. Application Data

(60) Provisional application No. 60/914,441, filed on Apr. 27, 2007.

(51) Int. Cl.
*G06F 17/50* (2006.01)
(52) U.S. Cl. ......................................................... 703/13
(58) Field of Classification Search .................. 703/1, 2, 703/9, 13; 310/52–65
See application file for complete search history.

(56) References Cited

U.S. PATENT DOCUMENTS

| | | | |
|---|---|---|---|
| 5,801,969 A | 9/1998 | Nagahama | |
| 6,748,349 B1 * | 6/2004 | Majumdar et al. | 703/9 |
| 6,798,079 B2 * | 9/2004 | Nelson et al. | 290/2 |
| 6,882,068 B2 * | 4/2005 | Weeber et al. | 310/59 |
| 2002/0073141 A1 | 6/2002 | Dewhurst | |
| 2006/0055256 A1* | 3/2006 | Kreitzer | 310/59 |
| 2006/0230840 A1 | 10/2006 | Ranganathan | |

OTHER PUBLICATIONS

Kuosa et al, "Numerical and Experimental Modelling of Gas Flow and Heat Transfer in the Air Gap of an Electric Machine", 2004, Journal of Thermal Science vol. 13, No. 3, pp. 264-278.*

* cited by examiner

*Primary Examiner* — Hugh Jones

(57) ABSTRACT

Certain exemplary embodiments can provide and/or utilize a method that can comprise automatically rendering a determined volumetric flowrate of air and a corresponding dynamic air pressure at each of a plurality of locations in an electric motor. The volumetric flowrate can be determined based upon obtained specification information and a model. The model can be calibrated based upon flow measurement data from an operating electric motor.

15 Claims, 19 Drawing Sheets

| Calculate | Input Units |
|---|---|
| | ☐ Metric Units |
| | ☐ English Units |

Input Description: 716 Frame, 4 pole, 60 hz, 6Kv 1288mm core, X Vent

| Ventilation & Fan Inputs ||||
|---|---|---|---|
| Type of Ventilation: || Fan Type: | NBG "RR" Type |
| ☐ End To Center "X" ||||
| ☐ End To End "Z" || Fan Type | ☐ RR1 - External Fan |
| Radial Vent model: ||| ☐ RR2 - Internal Fan |
| ☐ NBG TKU 53.01 ||||
| ☐ Fechheimer || Fan Outer Diameter | 800 mm |
| Airflow Calculation: ||||
| ☐ Shaft Fan & Rotor Vents || Fan Entrance Diameter | 516 mm |
| ☐ Rotor Vents Only ||||
| Rotational Speed: ||||
| 1800 | RPM | *Backward swept, radial fan with straight, blades & curved inlet* ||
| Shaft Diameter at Fan: ||| *Ref. NBG TKU 53.21* |
| 298 | mm |||

Fig. 1

| Stator Core & Frame Inputs | | |
|---|---|---|
| Core Length: | 1288 | mm |
| Stator ID: | 800 | mm |
| Stator OD: | 1250 | mm |
| Radial Air Gap: | 4.2 | mm |
| Stator Vent Width: | 8 mm | |
| Number of Stator Slots: | 96 | |
| Offset Vents: | ☐ Yes ☐ No | |
| Stator Slot Width: | 12.4 | mm |
| Stator Tooth Width: | 13.8 | mm |
| Support Tooth Thickness: | 10 | mm |

| Rotor Inputs | | |
|---|---|---|
| Rotor Axial Vent OD: | 480 | mm |
| Rotor Axial Vent ID: | 290 | mm |
| Fillet Weld At Spider: | 18.75 | mm |
| Number of Rotor Axial Vents: | 6 | |
| Rotor Axial Vent Web Thickness: | 50.8 | mm |
| Rotor Radial Vent Width: | 3/8 in | |
| Total Number Rotor Radial Vents: | 21 | |
| Number of Rotor Slots: | 78 | |
| Minimum Rotor Tooth Distance: | 19 | mm |
| Rotor Construction: | ☐ ADC ☐ CU | |

Fig. 2

| Coil Inputs | | |
|---:|:---:|:---|
| Coil Mean Turn Length: | 4468 | mm |
| Coil Straight Length Past Core (LE2): | 30 | mm |
| Coil-to-Coil Clearance at Diamond Section: | 5 | mm |
| Coil-toCoil Clearance at Knuckle: | 19.5 | mm |
| Loop Pin Diameter: | 30 | mm |
| Insulated Coil Height ("C" Dimension): | 46 | mm |
| Diameter to Nose: | 1129 | mm |
| Overall Coil Spread Length ("D" Dimension): | 2092 | mm |
| Percentage Coil Blockage: | 0.5 | |

| Miscellaneous Inputs, "Z" Ventilation | | |
|---:|:---:|:---|
| Frame Air Inlet & Outlet Axial Length: | 400 | mm |
| Frame Air Inlet & Outlet Lateral Length: | 1686 | mm |
| Air Inlet Axial Baffle Blockage: | 0 | mm |
| Frame Axial Vent OD: | 1600 | mm |
| Frame Axial Rib Thickness: | 80 | mm |
| # of Axial Yoke Ribs: | 8 | |
| Clearance Between Air Inlet Coils & Brg Housing: | 243 | mm |
| Clearance Between Air Outlet Coils & Air Deflector: | 106 | mm |
| Axial Dist. Between End Ring and End of Core: | 116 | mm |
| End Ring ID: | 616 | mm |
| Distance from Air Deflector to Core: | 473 | mm |
| Frame Axial Outlet Length (W/ Air Deflector Blockage): | 154 | mm |
| Inlet Bypass Area for Airflow Behind Core: | 70000 | mm^2 |
| End Turn Exit Area for Airflow Behind Core: | 714711 | mm^2 |
| Entrance Area for Airflow Behind Core: | 671434 | mm^2 |

Fig. 3

| Miscellaneous Inputs, "X" Ventilation | | |
|---|---:|---|
| Frame Air Inlet & Outlet Axial Length: | 400 | mm |
| Frame Air Inlet & Outlet Lateral Length: | 1686 | mm |
| Air Inlet Axial Baffle Blockage: | 220 | mm |
| Baffle Outer Diameter: | 1263 | mm |
| Clearance Between Coil & Air Deflector: | 74 | mm |
| Axial Dist. Between End Ring and End of Baffle: | 240 | mm |
| Equivalent Area for Air Entering Back Of Core (1 Side): | 260000 | mm^2 |
| 1/2 Total Outlet Area: | 1000000 | mm^2 |

| Miscellaneous Inputs | | |
|---|---:|---|
| Stator Core Cleat Width: | 30 | mm |
| # of Stator Core Cleats: | 24 | |
| Water Cooler / Tube Bundle Restriction: | 4 | Ns^2/m^8 |
| Air Inlet & Outlet Enclosure Restriction: | 0 | Ns^2/m^8 |

| Program Values | | |
|---|---:|---|
| Initial Q, for Iterative Purposes (Default =1000): | 6000 | |
| Delta Q, for Iterative Purposes (Default = 1000): | 500 | |
| Convergence Accuracy (Default = 0.001): | 0.001 | |

Fig. 4

| Area Calculations (mm^2) | |
|---|---|
| Air Inlet Area (AreaZ1): | 674400 |
| Entrance Area For Flow Around Coils, Top Half (AreaZ2): | 194400 |
| Exit Area For Flow Around Coils, Top Half (AreaZ3): | 213051 |
| Entrance Area For Flow Around Coils, Bottom Half (AreaZ4): | 215298 |
| Exit Area For Flow Around Coils, Bottom Half (AreaZ5): | 213051 |
| Entrance Area For Flow Through Coils, Top Half (AreaZ6): | 177253 |
| Air Inlet Stator Coil Area, Top Half (AreaZ7): | 32253 |
| Air Inlet Stator Coil Exit Area, Top Half (AreaZ8): | 390441 |
| Entrance Area For Flow Through Coils, Bottom Half (AreaZ9): | 87449 |
| Air Inlet Stator Coil Area, Bottom Half (AreaZ10): | 32253 |
| Air Inlet Coil Exit Area, Bottom Half (AreaZ11): | 390441 |
| Rotor Core Axial Inlet Area (AreaZ12): | 83090 |
| Inlet Bypass, Air Behind Stator Core (AreaZ13): | 70000 |
| Entrance Area to End Turns, Air Behind Stator Core (AreaZ13A): | 320808 |
| Coil Area, Air Behind Stator Core (AreaZ13B): | 100661 |
| Coil Exit Area, Air Behind Stator Core (AreaZ13C): | 714711 |
| Entrance Area, Air Behind Stator Core (AreaZ13D): | 671434 |
| Frame Axial Vent Area (AreaZ14): | 671434 |
| Flow Behind Core, Horizontal Outlet Area (AreaZ15): | 1857465 |
| Air Outlet Stator Coil Area (AreaZ16): | 541132 |
| Area Between Air Outlet Coil and Baffle (AreaZ17): | 1176295 |
| Fan Entrance Area (AreaZ18): | 139370 |
| Frame Outlet Contraction Area (AreaZ19): | 259644 |
| Frame Outlet Area (AreaZ20): | 674400 |
| Rotor Radial Vent Inlet Area (AreaCore1): | 14363 |
| Rotor Core Internal Area (AreaCore2): | 11021 |
| Radial Vent Outlet Area At Rotor (AreaCore3): | 23688 |
| Air Gap Axial Expans/Contract Area (AreaCore4): | 145596 |
| Radial Vent Outlet Area At Stator (AreaCore5): | 20109 |
| Stator Core Internal Area (AreaCore6): | 9447 |
| Radial Vent Outlet Area (AreaCore7): | 31420 |
| Area Between Coils in LE2 Area: | 26496 |
| Area in Diamond Portion: | 189644 |
| Area Between U-Bands: | 114192 |
| Area Between Baffle & Stator Coil, Air Inlet Side: | 861886 |
| Area Between Baffle & Stator Coil, Air Outlet Side: | 375967 |

Fig. 6

| | Air Flow Network | Airflow (m^3/s) | Max Velocity (m/s) | Resistance (Ns^2/m^8) | Pressure Drop (mbar) |
|---|---|---|---|---|---|
| Inlet | Air Inlet (R1): | 6.627 | 9.827 | 0.5396 | 0.2370 |
| | Inlet w/ Baffle Blockage (R2): | 6.627 | 9.827 | 0.0000 | 0.0000 |
| Inlet Coils | Flow Around Coils, Top Half (R3): | 2.720 | 13.991 | 0.1146 | 0.0085 |
| | 90°, Flow Around Coils, Top Half (R4): | 2.720 | 12.766 | 15.7547 | 1.1655 |
| | 90°, Flow Around Coils, Bottom Half (R5): | 1.939 | 9.006 | 15.4275 | 0.5800 |
| | Flow Around Coils, Bottom Half (R6): | 1.939 | 9.101 | 0.0466 | 0.0018 |
| | 90°, Flow Around Coils, Bottom Half (R7): | 1.939 | 9.101 | 15.7547 | 0.5923 |
| | Flow Through Coils, Top Half (R8): | 0.418 | 12.969 | 209.1887 | 0.3660 |
| | Flow Exiting Coils, Top Half (R9): | 0.418 | 12.969 | 457.1208 | 0.7998 |
| | 90°, Flow Exiting Coils, Top Half (R10): | 0.418 | 1.071 | 4.6910 | 0.0082 |
| | 90°, Flow Through Coils, Bottom (R11): | 0.403 | 4.613 | 93.5119 | 0.1522 |
| | Flow Through Coils, Bottom Half (R12): | 0.403 | 12.507 | 166.1371 | 0.2703 |
| | Flow Exiting Coils, Bottom Half (R13): | 0.403 | 12.507 | 457.1208 | 0.7438 |
| | 90°, Flow Exiting Coils, Bottom Half (R14): | 0.403 | 1.033 | 4.6910 | 0.0076 |
| Air Behind Core | Rotor Core Axial Inlet (R15): | 3.416 | 41.109 | 54.9673 | 6.4131 |
| | 90°, Bypass to Back Of Core (R16): | 1.147 | 16.386 | 145.9421 | 1.9202 |
| | Bypass to Back Of Core (R17): | 1.147 | 16.386 | 47.3222 | 0.6226 |
| | Bypass to Coil Exit Area (R17A): | 1.147 | 16.386 | 93.8251 | 1.2345 |
| | Coil Exit Area to Behind Stator Core (R17B): | 3.212 | 4.783 | 0.0287 | 0.0030 |
| | Entrance to End Turns (R17C): | 2.065 | 6.436 | 0.5940 | 0.0253 |
| | Flow Through Coil Bypass (R17D): | 2.065 | 20.512 | 18.4828 | 0.7879 |
| | Coil Bypass Exit (R17E): | 2.065 | 20.512 | 41.1597 | 1.7547 |
| Outlet Coils | 90°, Exit From Back of Core (R18): | 6.627 | 12.247 | 1.5862 | 0.6967 |
| | Entrance To Baffle (R19): | 6.627 | 9.871 | 0.5110 | 0.2244 |
| | Flow Through Coils (R20a): | 2.023 | 12.247 | 7.0714 | 0.2894 |
| | Flow Around Coil (R20b): | 4.605 | 5.342 | 1.3647 | 0.2894 |
| Outlet | Baffle To End Ring (R21): | 6.627 | 12.247 | 0.5626 | 0.2471 |
| | Fan Entrance (R22): | 6.627 | 47.553 | 11.8123 | 5.1884 |
| | 90° To Fan Entrance (R23): | 6.627 | 9.827 | 2.9453 | 1.2937 |
| | Air Outlet, Excluding Coolers & Enclosures (R24): | 6.627 | 25.525 | 3.1699 | 1.3923 |

Fig. 7

| Airflow Summary | | |
|---|---|---|
| Total Airflow: | 6.627 | m^3/s |
| Pressure Developed By Shaft Fan: | 15.2048 | mbar |
| Total Resistance Through Motor: | 34.6165 | Ns^2/m^8 |
| Shaft Fan Efficiency: | | |
| Shaft Fan Loss: | N/A | KW |
| Flow Around Air Inlet Coils: | 4.907 | m^3/s |
| Flow Through Air Inlet Coils, Inlet Stickout: | 0.573 | m^3/s |
| Flow Through Air Inlet Coils, Coil Bypass: | 2.065 | m^3/s |
| Flow Through Air Outlet Coils: | 2.023 | m^3/s |
| Flow Around Air Outlet Coils: | 4.605 | m^3/s |
| Flow Entering Rotor Core: | 3.416 | m^3/s |
| Flow Entering Back of Core: | 3.212 | m^3/s |
| Axial To Radial Vent Area Ratio (Wressnig): | 0.592 | (1.2 Recommended) |
| Rotor Peripheral Velocity: | 74.606 | m/s |
| 15% of Rotor Peripheral Velocity: | 11.191 | m/s |
| Initial Q (Final Calculated): | 4.000 | m^3/s |
| Pressure Iteration Error ($\varepsilon_p$): | 9.51E-04 | |
| Airflow Iteration Error ($\varepsilon_Q$): | -1.16E-04 | |

Program Iteration Values { Initial Q (Final Calculated); Pressure Iteration Error ($\varepsilon_p$); Airflow Iteration Error ($\varepsilon_Q$) }

Fig. 8

"Z" VENTILATION AIR FLOW PATTERN

|  | Z | | | X | | |
|---|---|---|---|---|---|---|
|  | Total Airflow Meas. $m^3/s$ | Total Airflow Calc. $m^3/s$ | Enclosure Restriction $Ns^2/m^8$ | Total Airflow Meas. $m^3/s$ | Total Airflow Calc. $m^3/s$ | 1/2 Enclosure Restriction $Ns^2/m^8$ |
| No Top Enclosure | 7.0 | 7.2 | 0 | 11.9 | 12.3 | 0 |
| WPII Enclosure | 6.9 | 6.9 | 6 | 8.3 | 8.3 | 23 |
| Internal Air with TEAAC Enclosure | 5.9 | 5.9 | 25 | 7.5 | 7.6 | 32 |

Fig. 12

DEVICES, SYSTEMS, AND METHODS FOR DESIGNING A MOTOR

CROSS-REFERENCES TO RELATED APPLICATIONS

This application claims priority to, and incorporates by reference herein in its entirety, pending U.S. Provisional Patent Application Ser. No. 60/914,441, filed 27 Apr. 2007.

BACKGROUND

An electric motor can be cooled via a circulation of air through the electric motor. The circulation of air can be by means of a fan mounted to a motor shaft or by using an external blower that operates independently of the electric motor. A total amount of airflow and the distribution of air through the machine directly can contribute to a capability of the electric motor to remove heat and/or transmit energy to a connected machine. Predicting an airflow and/or a pressure of cooling air at a predetermined location within the electric motor can be desirable.

SUMMARY

Certain exemplary embodiments can provide and/or utilize a method that can comprise automatically rendering a determined volumetric flowrate of air and a corresponding dynamic air pressure at each of a plurality of locations in an electric motor. The volumetric flowrate can be determined based upon obtained specification information and a model. The model can be calibrated based upon flow measurement data from an operating electric motor.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 1 is a user interface adapted to receive a plurality of exemplary input parameters;

FIG. 2 is a user interface adapted to receive a plurality of exemplary input parameters;

FIG. 3 is a user interface adapted to receive a plurality of exemplary input parameters;

FIG. 4 is a user interface adapted to receive a plurality of exemplary input parameters;

FIG. 6 is a table of exemplary calculation results;

FIG. 7 is a table of exemplary calculation results;

FIG. 8 is a table of exemplary calculation results;

FIG. 12 is a table of results that indicate measured versus calculated airflow values for exemplary electric motors;

DETAILED DESCRIPTION

Figure 5:
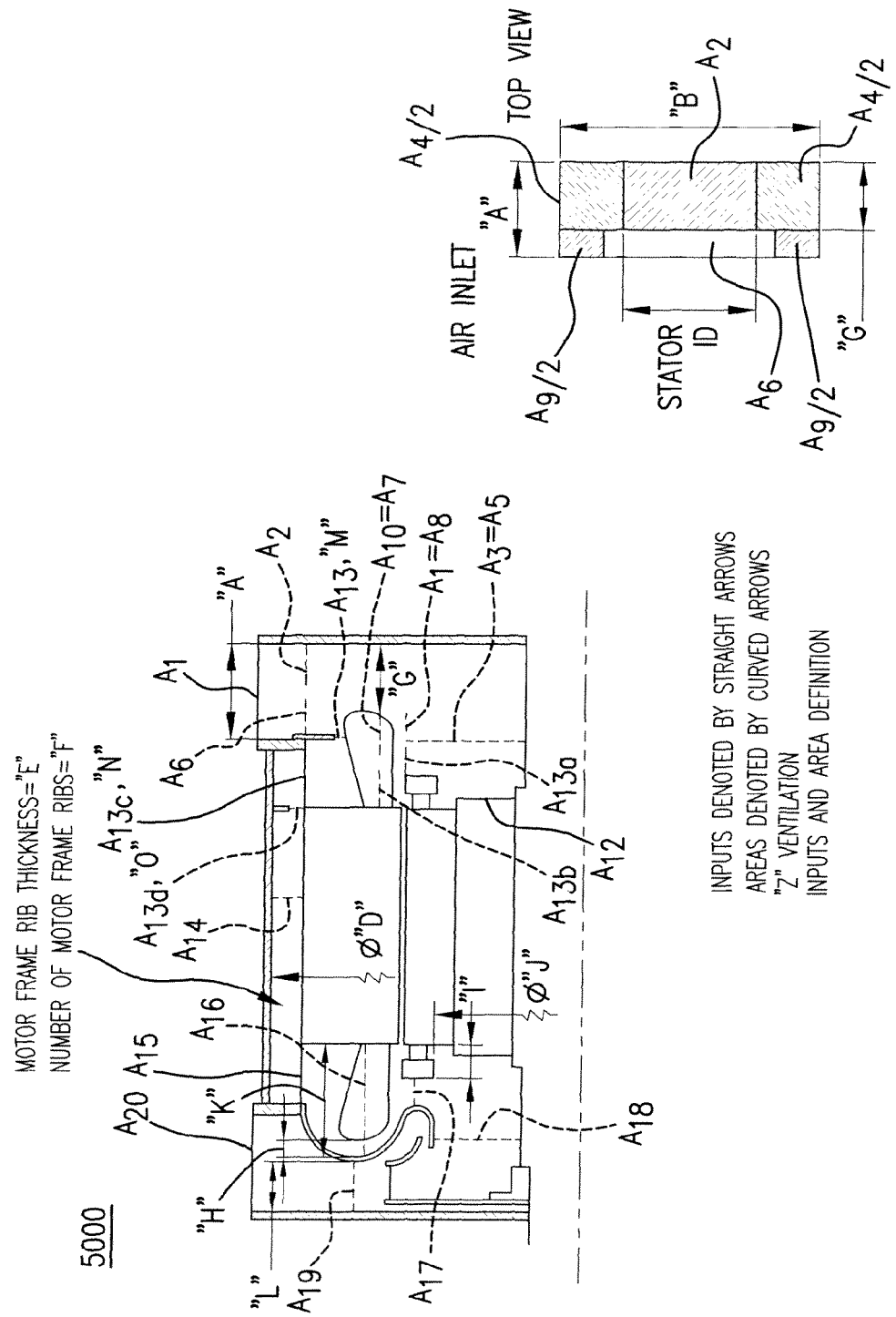
FIG. 5 illustrates two sectional views of an exemplary embodiment of an electric motor 5000 with a Z-pattern of ventilation.

Certain exemplary embodiments can provide a method that can comprise automatically rendering a determined volumetric flowrate of air and a corresponding dynamic air pressure at each of a plurality of locations in an electric motor. The volumetric flowrate can be determined based upon obtained specification information and a model. The model can be calibrated based upon flow measurement data from an operating electric motor.

A total power output of an electric motor can depend, at least in part, on an ability to transfer heat generated by the electric motor. Due to internal complexities of electric motors, accurate estimation volumetric flow rates of air at various locations inside the electric motors can be challenging, yet desirable. An accurate prediction of airflow through each portion of the electric motor can help predict effects of small changes in motor geometry on heat transfer. Airflows for certain exemplary electric motors can be estimated via a method that can comprise activities, such as:
- estimating an airflow using measured data taken from a similar electric motor;
- analytical calculations might provide accurate results if calibrated to a specific electric motor, but might not provide sufficient detail to accurately predict a temperature distribution through the electric motor; and/or
- computation fluid dynamics (CFD) analysis, which can provide accurate results, can involve a relatively high level of effort to generate a geometry of the electric motor.

Certain exemplary embodiments can utilize a substantially one-dimensional analysis using general airflow network building software. One-dimensional analysis can provide relatively accurate results of airflows within the electric motor. Certain exemplary embodiments can utilize a computer program to perform a one-dimensional analysis of volumetric flow rates and corresponding pressures at certain locations in the electric motor. The computer program can be calibrated with measured data in order to produce more accurate results.

The computer program can provide:
- an output is that is dependent on several inputs related to the electric motor, the inputs can be modified to check effects of design changes on airflows through the electric motor; and
- sufficient detail can be added to the program to provide relatively accurate results, the computer program can have one or more of the following capabilities:
  - an ability to analyze both an X-pattern of ventilation and a Z-pattern of ventilation;
  - an ability to account for a pressure increase (fan effect) due to radial vents of a rotor core;

an ability to calculate an airflow through each radial vent in the core;

an ability to calibrate the calculation results with measured data to further increase the accuracy of the computer program; and/or an ability to analyze several ventilation types.

Certain exemplary embodiments can include computer-assisted method of determining airflow within an electric motor. A computer program can perform a one-dimensional analysis of a volumetric flow rate and a corresponding dynamic pressure for each location of interest within the electric motor. The computer program can receive as inputs information comprising:

1. dimensional information of the electric motor;
2. configuration information of the electric motor;
3. fan configuration, inlet dimensions, and/or outlet dimensions;
4. a predetermined threshold of estimate accuracy; and/or
5. an initial flow estimate.

The computer program can iteratively estimate a volumetric flow rate and a corresponding dynamic pressure at each radial vent in a core of the electric motor until a measure of convergence of each estimate is below the predetermined threshold. In a calibration estimate, each flow rate at each radial vent can be calibrated to actual measured airflow data from an operating electric motor. Certain embodiments can determine a fan curve from measured airflow data. The computer program can simulate airflows for both an X-pattern of ventilation and a Z-pattern of ventilation via a single calibration without modeling a three-dimensional air space.

FIG. 1 is a user interface adapted to receive a plurality of exemplary input parameters. The user interface can provide and/or comprise a button that can be adapted to trigger a calculation of values based upon the exemplary input parameters. In certain exemplary embodiments, a user can specify via the user interface:

whether input units are English or metric;
whether the electric motor is ventilated via an X-pattern of ventilation and a Z-pattern of ventilation;
whether a fan of the electric motor is an external fan or an internal fan;
a fan outer diameter;
a fan entrance diameter;
a radial vent model and/or configuration of the electric motor;
specifications regarding locations to determine airflows and/or air pressures;
a fan rotational speed;
a fan diameter; and/or
a fan shaft diameter, etc.

FIG. 2 is a user interface adapted to receive a plurality of exemplary input parameters. In certain exemplary embodiments, a user can specify via the user interface:

core dimensions and/or parameters;
stator dimensions and/or parameters; and/or
rotor dimensions and/or parameters, etc.

FIG. 3 is a user interface adapted to receive a plurality of exemplary input parameters. In certain exemplary embodiments, a user can specify via the user interface:

coil dimensions and/or parameters; and/or
other dimensions and/or parameters of the electric motor, wherein the electric motor has a Z-pattern of ventilation, etc.

FIG. 4 is a user interface adapted to receive a plurality of exemplary input parameters. In certain exemplary embodiments, a user can specify via the user interface:

other dimensions and/or parameters of the electric motor, wherein the electric motor has a X-pattern of ventilation;
an initial airflow estimate;
a specification of an interval for air flowrate iterations; and/or
a specification of an accuracy of the flow estimate, etc.

Information received via the user interfaces of FIGS. 1-4 can be used by the computer program to calculate airflows and/or air pressures at a plurality of predetermined locations within the electric motor.

FIG. 5 illustrates two sectional views of an exemplary embodiment of an electric motor 5000 with a Z-pattern of ventilation. Electric motor 5000 can define a plurality of apertures adapted to transfer cooling air via the Z-pattern of ventilation. Each of the plurality of apertures can define a cross-sectional area that is approximately perpendicular to a direction of flow of the cooling air. FIG. 5 also illustrates certain exemplary dimensions that can be used as inputs for a one-dimensional airflow model.

FIG. 6 is a table of exemplary calculation results, which can comprise calculations of cross-sectional areas of apertures approximately perpendicular to an expected direction of airflow through the plurality of apertures. The cross-sectional areas can be related to a resistance to airflow that can result in a loss of air pressure as cooling air moves through the electric motor.

FIG. 7 is a table of exemplary calculation results, which can comprise an identification of airflows at a plurality of locations in the electric motor. The airflows can be categorized into groups of airflows, such as, airflows in proximity to inlet coils, in proximity to the core of the motor, in proximity to outlet coils, and/or in proximity to a cooling air outlet, etc. The table of calculation results can comprise, at each of the plurality of locations, an airflow estimate, an air velocity, an estimated flow resistance, and/or an estimated pressure drop.

FIG. 8 is a table of exemplary calculation results, which can represent a summary of the results presented in FIG. 7. For example, the calculation results can comprise a total air pressure developed by the fan, total resistance to airflow, fan efficiency, total flow in proximity to inlet coils, total flow in proximity to outlet coils, total flow in proximity to the rotor, and/or estimates of errors associated with the calculations, etc.

Figure 9:
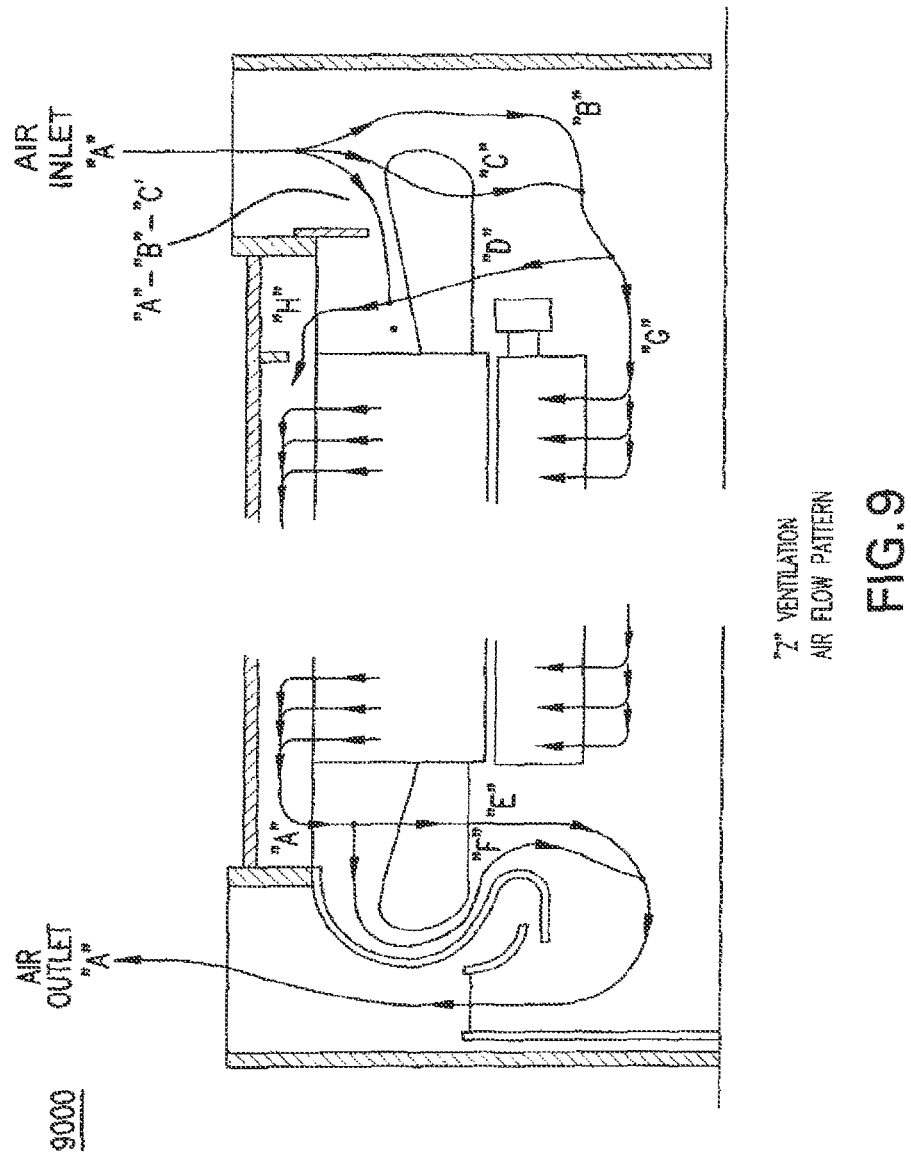
FIG. 9 is a sectional view of an exemplary embodiment of an electric motor 9000 with a Z-pattern of ventilation.

FIG. 9 illustrates two sectional views of an exemplary embodiment of an electric motor 9000 with a Z-pattern of ventilation. FIG. 9 illustrates schematically airflow divisions within the electric motor. An airflow of cooling air can enter the electric motor via an air inlet. The cooling air can be routed, via a plurality of openings, through portions of the electric motor rotor. The cooling air can flow between gaps between rotor bars of the rotor. The cooling air can exit the electric motor at an opposing end of the electric motor from an end of the electric motor comprising the air inlet.

Figure 10:
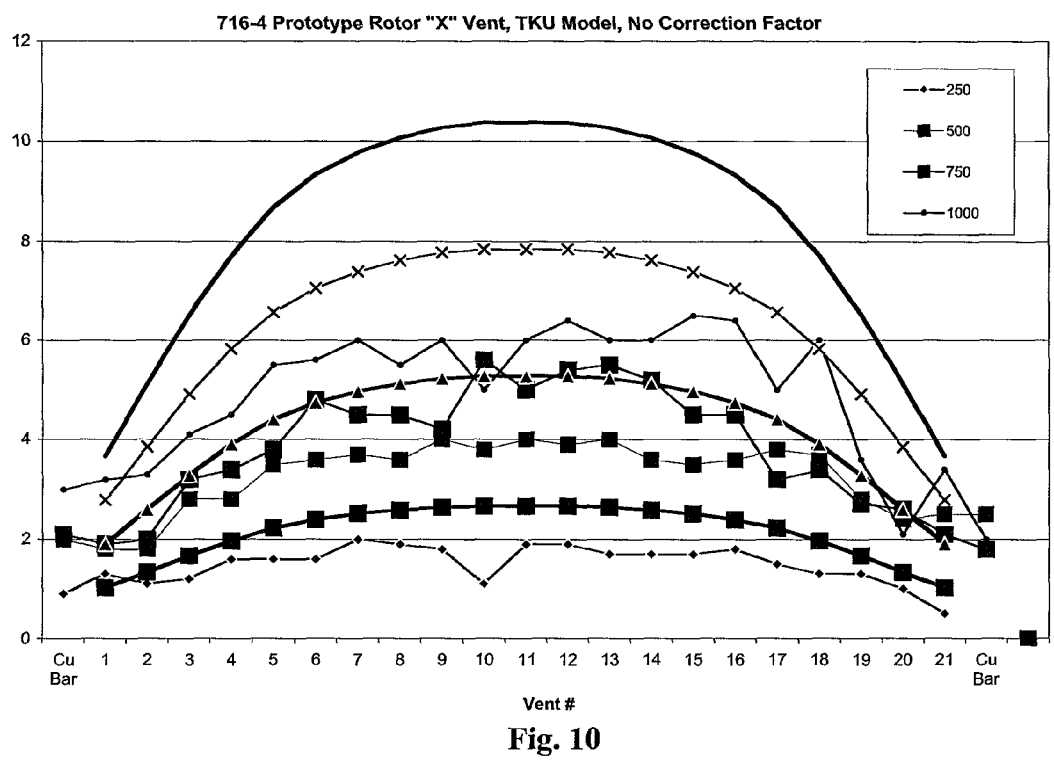
FIG. 10 is a graph of air velocities that are calculated, via un-calibrated calculations, for each of a plurality of vents comprised by an exemplary electric motor.

FIG. 10 is a graph of air velocities calculated and measured air flow data at four different rotational speeds, 250 RPM, 500 RPM, 750 RPM, and 1000 RPM at predetermined vent locations. The points on the calculated lines were determined via un-calibrated calculations for each of a plurality of vents comprised by an exemplary electric motor. The smooth lines are the calculated data and the jagged lines are the measured data. The exemplary rotor core upon which the data is based consists of 21 vents equally spaced along the axial length of the core. The copper (CU) rotor bars that are inserted along the axial length of the core extend slightly beyond the ends of the core itself. This rotor bar extension can also act like a fan.

Figure 11:
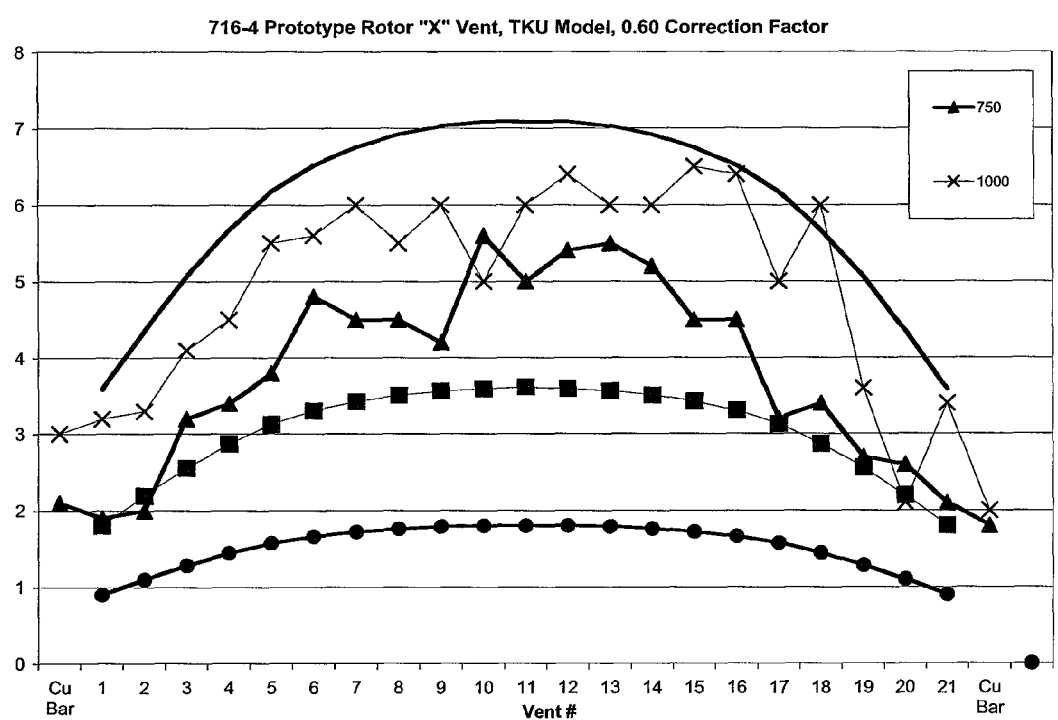
FIG. 11 is a graph of air velocities calculated and measured air flow data at two different rotational speeds, 750 RPM and 1000 RPM, at predetermined vent locations.
Figure 19:
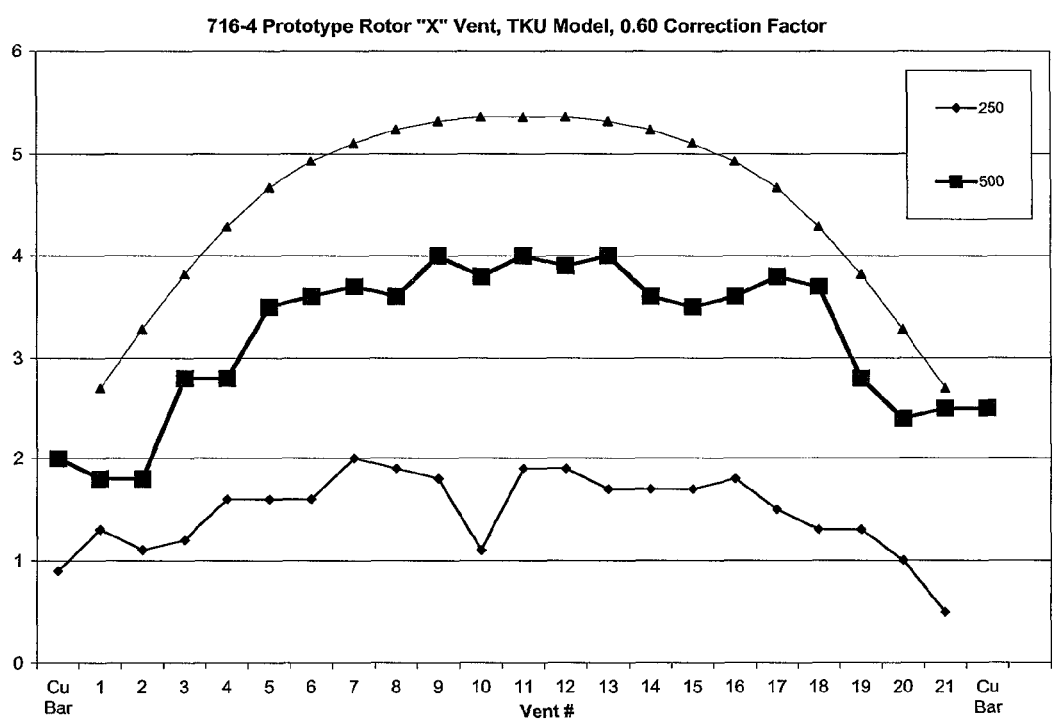
FIG. 19 is a graph of air velocities calculated and measured air flow data at two different rotational speeds, 250 RPM and 500 RPM, at predetermined vent locations.

FIG. 11 and FIG. 19 are graphs of air velocities calculated and measured air flow data at four different rotational speeds, 250 RPM, 500 RPM, 750 RPM, and 1000 RPM at predetermined vent locations. The points on the calculated lines were determined via calibrated calculations for each of a plurality of vents comprised by an exemplary electric motor. The smooth lines are the calculated data and the jagged lines are the measured data. The exemplary rotor core upon which the data is based consists of 21 vents equally spaced along the axial length of the core. The calculated and measured data of FIG. 11 and FIG. 19 appeared to agree to a greater degree as compared to those of FIG. 10. By applying a 0.60 multiplier to the calculated data, the calculated versus measured data appeared to agree more closely. The value of 0.60 is a calibration factor used to the correct the data.

FIG. 12 is a table of results that indicate measured versus calculated airflow values for exemplary electric motors. FIG. 12 provides exemplary results for five different types of electric motor enclosures and compares measured airflows in each enclosure to predicted values based upon a one-dimensional model. The table of results also indicates a determined enclosure restriction for three exemplary enclosures. The calculated values appear to be relatively similar to the measured values.

Figure 13:
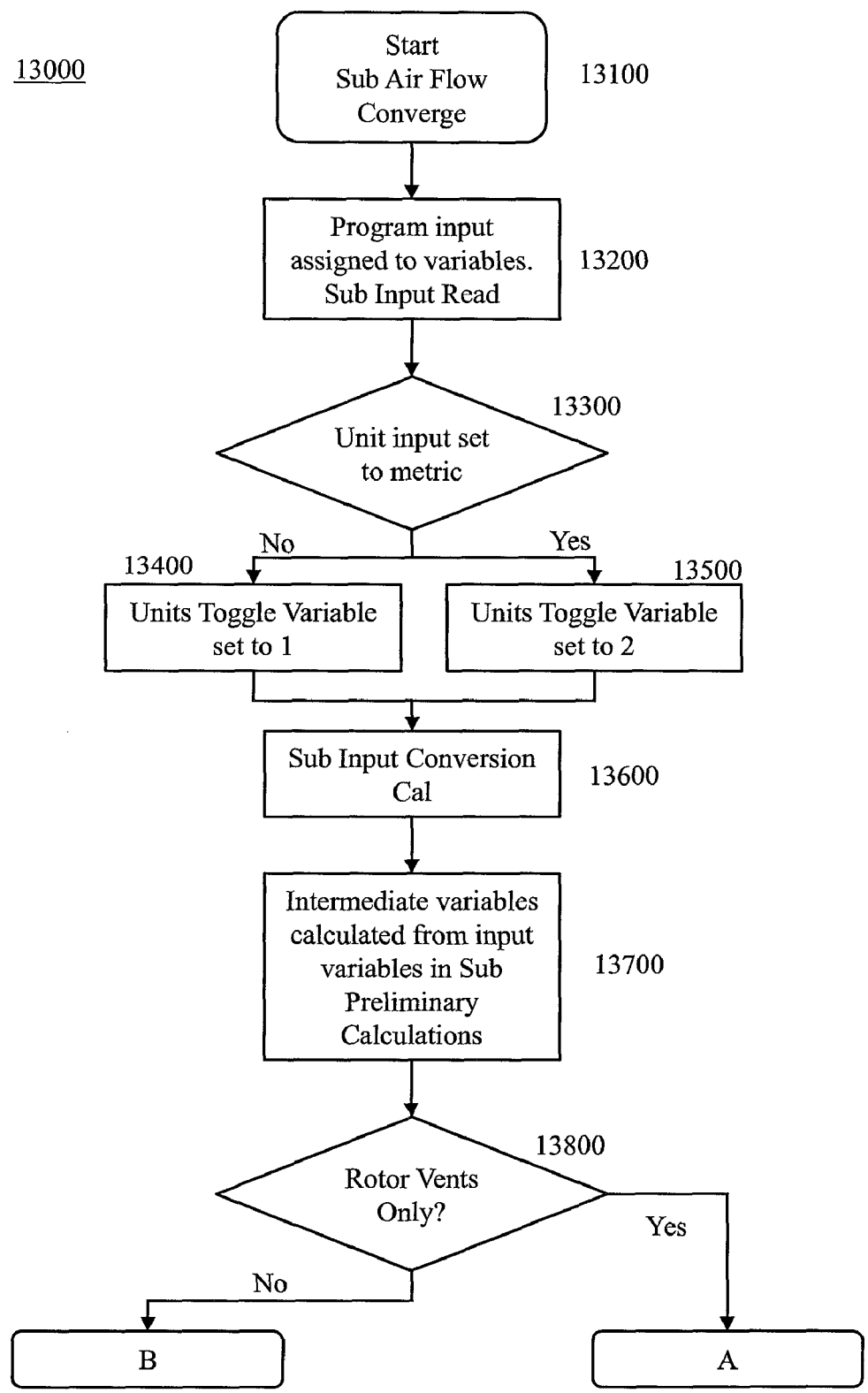
FIG. 13 is a flowchart of an exemplary embodiment of a method 13000.

FIG. 13 is a flowchart of an exemplary embodiment of a method 13000, which can comprise a plurality of activities and/or computer program subroutines. At activity 13100, a subroutine "Air Flow Converge" can be executed to estimate airflows in an electric motor. At activity 13200, input data can be received and/or assigned to variables. A user interface can be provided to a user via a subroutine "Input Read".

At activity 13300, a determination can be made whether the input data is in metric or English units. At activity 13400 a unit toggle variable can be set to a first predetermined value of the input data is not metric. At activity 13500 the unit toggle variable can be set to a second predetermined value of the input data is metric. At activity 13600, a subroutine "Input Conversion Cal" can be executed, which can convert the input data from first predetermined units of measure to second predetermined units of measure. At activity 13700, a subroutine Preliminary Calculation can determine values related to airflow and/or air pressure estimates based upon the input data. At activity 13800, a determination can be made whether the electric motor comprises rotor vents only, or comprises shaft fan vents and rotor vents. If the electric motor has rotor vents only, in certain exemplary embodiments, method 13000 can continue at transfer point A, which can be an entry point in method 14000 of FIG. 14. If the electric motor has shaft fan vents and rotor vents, in certain exemplary embodiments, method 13000 can continue at transfer point B, which can be an entry point in method 15000 of FIG. 15.

Figure 14:
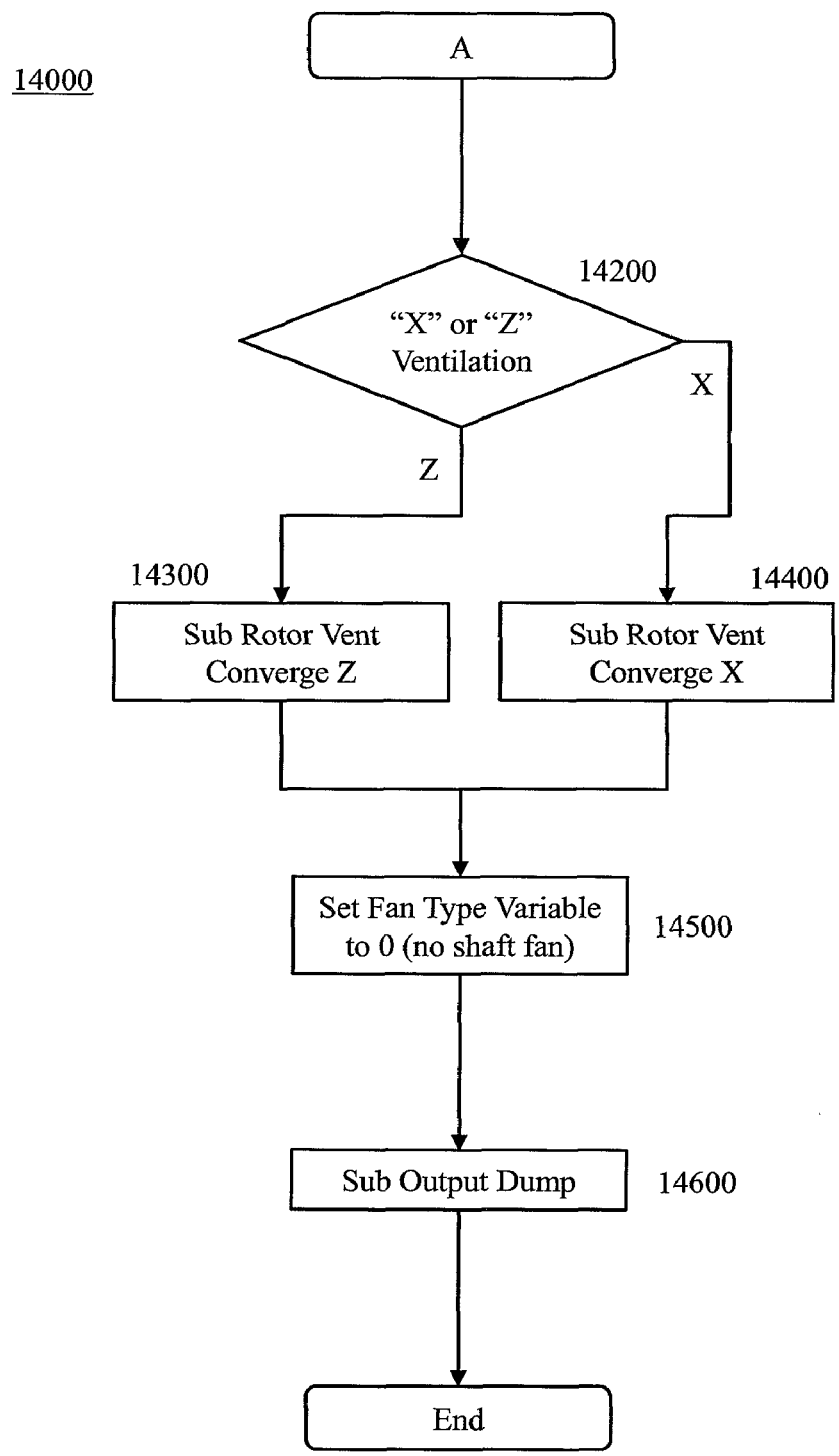
FIG. 14 is a flowchart of an exemplary embodiment of a method 14000.

FIG. 14 is a flowchart of an exemplary embodiment of a method 14000. Method 14000 can comprise a transfer point A, which can correspond to transfer point A of method 13000 of FIG. 13. At activity 14200 a determination can be made regarding whether the electric motor has an X-pattern of ventilation or a Z-pattern of ventilation.

If the electric motor has an X-pattern of ventilation, at activity 14400 a subroutine "Rotor Vent Converge X" can be executed. The subroutine "Rotor Vent Converge X" can estimate airflows and/or air pressures at one or more rotor vents for the X-pattern of ventilation. If the electric motor has a Z-pattern of ventilation, at activity 14300 a subroutine "Rotor Vent Converge Z" can be executed. The subroutine "Rotor Vent Converge Z" can estimate airflows and/or air pressures at one or more rotor vents for the Z-pattern of ventilation.

At activity 14500 a fan type variable can be set to a predetermined value, such as zero, which can be indicative that no shaft fan is comprised by the electric motor. At activity 14600, estimated airflows and/or air pressures at predetermined locations in the electric motor can be rendered to a user via a subroutine "Output Dump". Method 14000 can end subsequent to an execution of activity 14600.

Figure 15:
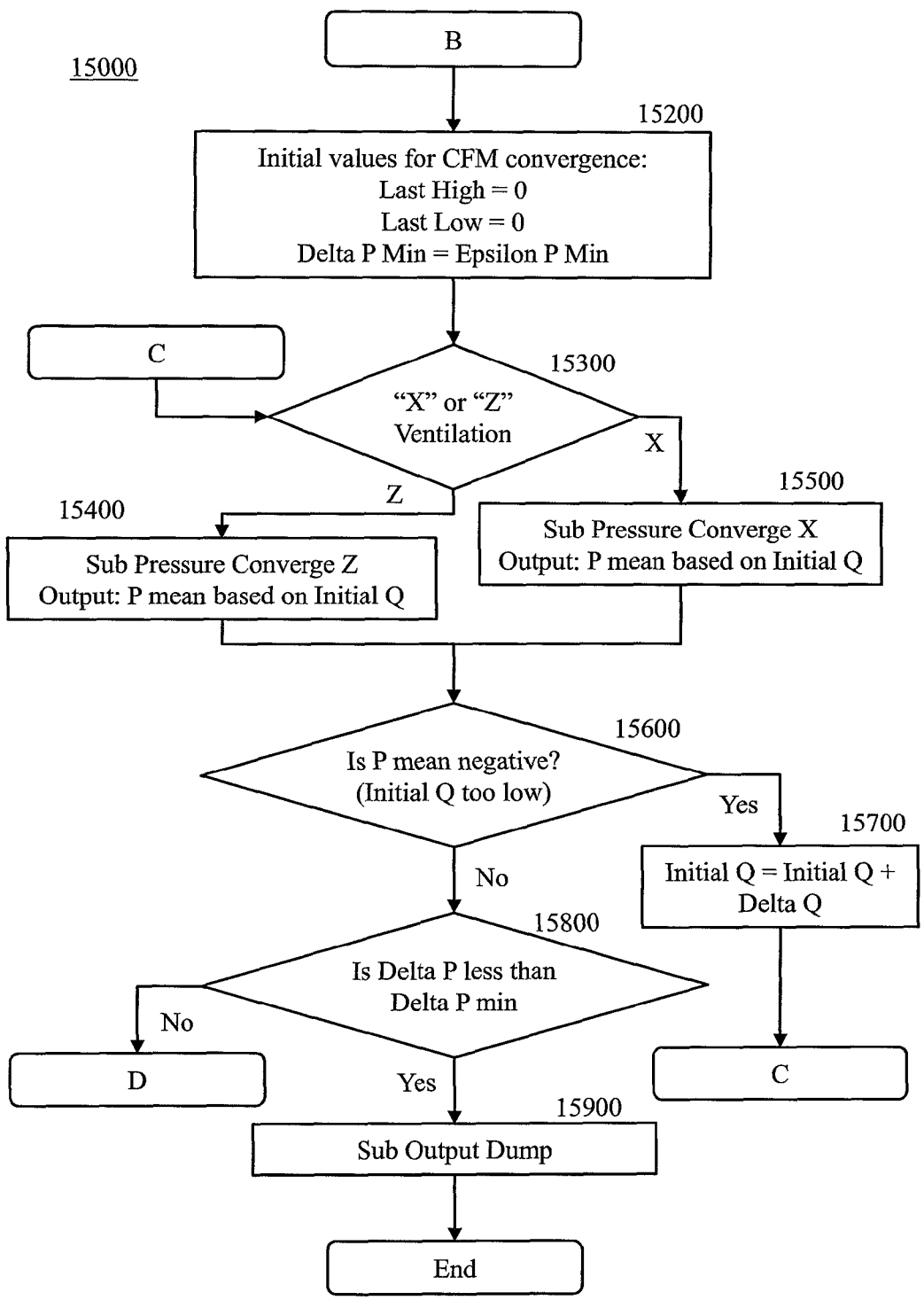
FIG. 15 is a flowchart of an exemplary embodiment of a method 15000.

FIG. 15 is a flowchart of an exemplary embodiment of a method 15000. Method 15000 can have a transfer point B, which can correspond to transfer point B of method 13000 of FIG. 13. At activity 15200, initial values can be set for a convergence of a flow rate estimate. In addition, a threshold can be set for an estimate of a pressure drop associated with an airflow in the electric motor. At activity 15300, a determination can be made regarding whether the electric motor has an X-pattern of ventilation, or a Z-pattern of ventilation.

If the electric motor has an X-pattern of ventilation, at activity 15500 a subroutine "Pressure Converge X" can be executed. The subroutine "Pressure Converge X" can estimate airflows and/or air pressures at one or more vents for the X-pattern of ventilation. If the electric motor has a Z-pattern of ventilation, at activity 15400 a subroutine "Pressure Converge Z" can be executed. The subroutine "Pressure Converge Z" can estimate airflows and/or air pressures at one or more vents for the Z-pattern of ventilation.

At activity 15600, a determination can be made whether an average air pressure in the electric motor is negative. If the average air pressure is negative an initial flow estimate can be increased by a predetermined flow increment. Method 15000 can continue subsequent to activity 15700 at activity 15300 via transfer point C. If the average air pressure is not negative, at activity 15800, a determination can be made regarding whether a change in an air pressure estimate is less than a predetermined threshold. If the change in the air pressure estimate is less than the predetermined threshold, at activity 15900, estimated airflows and/or air pressures at predetermined locations in the electric motor can be rendered to a user via the subroutine "Output Dump". Method 15000 can end subsequent to an execution of activity 15900. If the change in the air pressure estimate is not less than the predetermined threshold, method 15000 can continue via transfer point D, which can be an entry point to method 16000 of FIG. 16.

Figure 16:
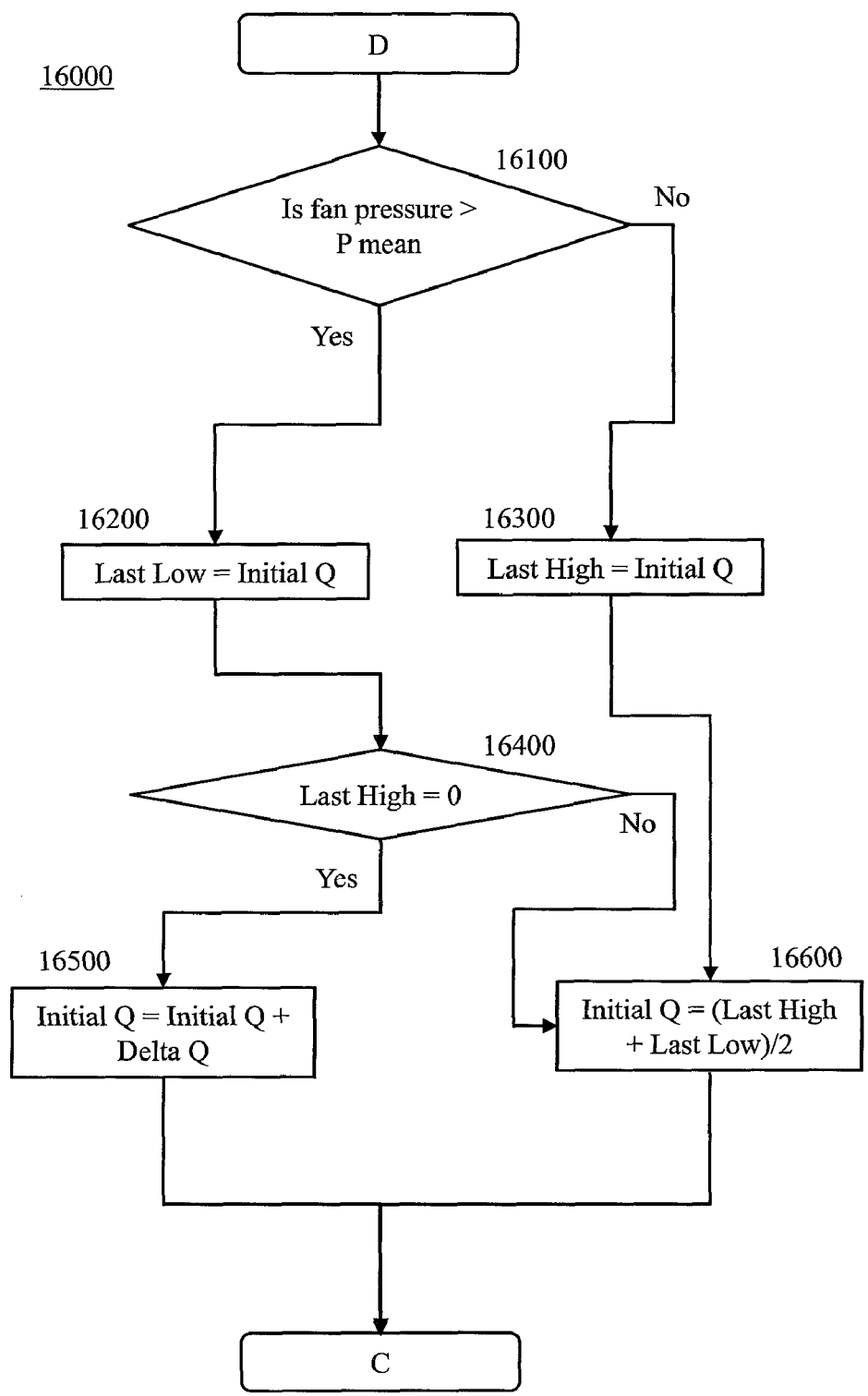
FIG. 16 is a flowchart of an exemplary embodiment of a method 16000.

FIG. 16 is a flowchart of an exemplary embodiment of a method 16000. Method 16000 can have a transfer point D, which can correspond to transfer point D of method 15000 of FIG. 15. At activity 16100, a determination can be made whether a fan pressure is greater than the average pressure of cooling air in the electric motor. If the fan pressure is greater than the average pressure of cooling air in the electric motor, at activity 16200 a variable "Last Low" can be assigned a value corresponding to an initial airflow estimate. At activity 16400, a determination can be made whether a variable "Last High" is approximately equal to zero. If the variable "Last High" is approximately equal to zero, at activity 16500 the initial flowrate estimate can be incremented by a predetermined cooling air flowrate increment. If the variable "Last High" is not approximately equal to zero, at activity 16600 the initial flowrate estimate can be set to a value that is approximately half of a sum of the variable "Last High" and the variable "Last Low".

If the fan pressure is not greater than the average pressure of cooling air in the electric motor, at activity 16300 a variable "Last High" can be assigned a value corresponding to an initial airflow estimate. Subsequent to activity, at activity 16600, the initial flowrate estimate can be set to a value that is approximately half of a sum of the variable "Last High" and the variable "Last Low". Subsequent to activity 16500 and/or activity 16600, method 16000 can continue to transfer point C, which can correspond to transfer point C of method 15000 as illustrated in FIG. 15.

Figure 17:
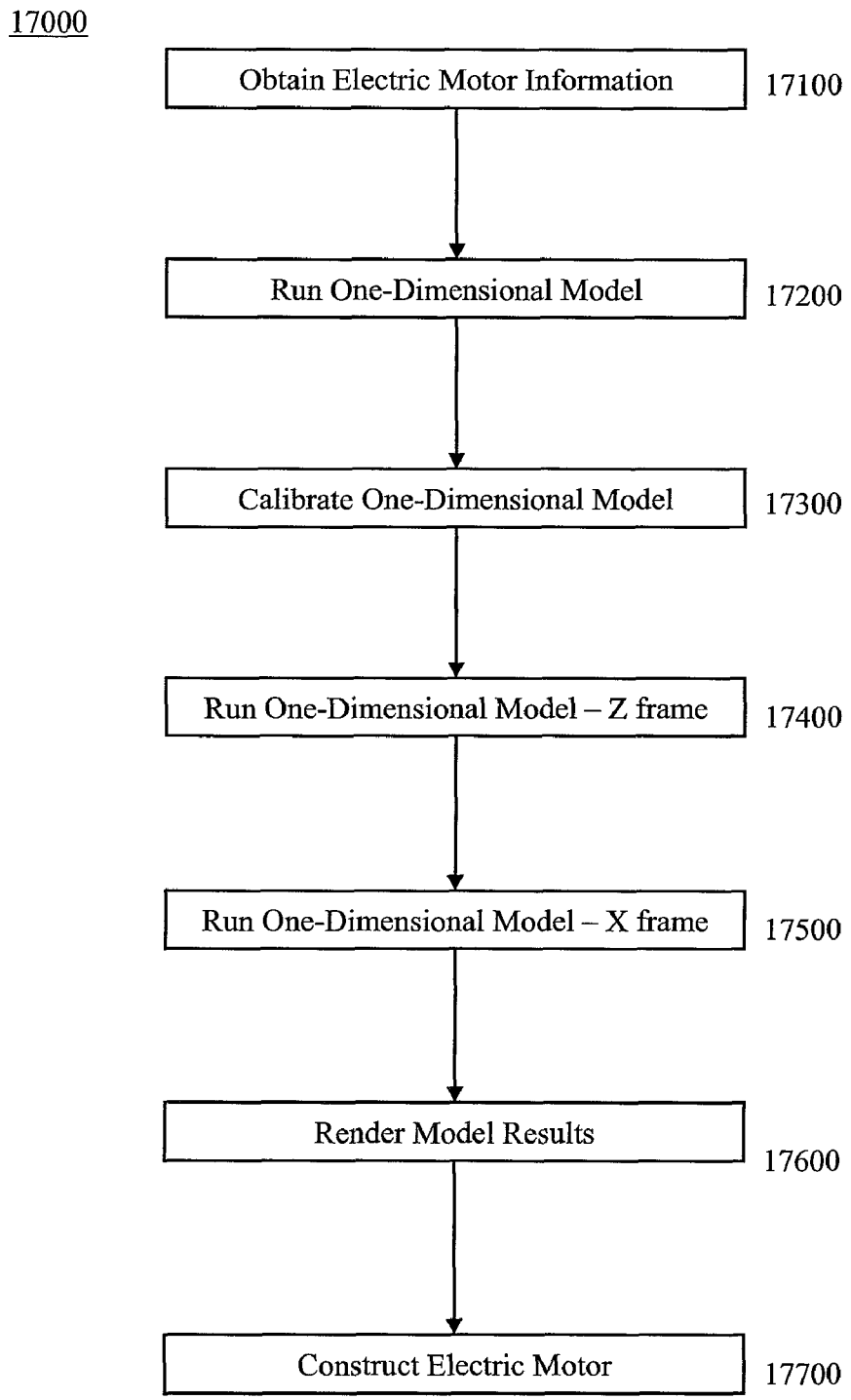
FIG. 17 is a flowchart of an exemplary embodiment of a method 17000.

FIG. 17 is a flowchart of an exemplary embodiment of a method 17000. At activity 17100, electric motor information can be obtained. The electric motor information can relate to an electric motor selected from a group that can comprise a Weather Protected type II (WPII) enclosure, a Totally Enclosed Air to Air Cooled (TEAAC) enclosure, and/or a Totally Enclosed Water to Air Cooled (TEWAC) enclosure. In certain exemplary embodiments, a user interface can be provided that is adapted to request and/or obtain the electric motor and/or specification information. The specification information can comprise configuration information of the electric motor; dimensional and/or configuration information of a cooling air fan associated with the electric motor; a predetermined threshold of accuracy associated with the volumetric flowrate; and/or an initial airflow estimate at a predetermined location in the electric motor; etc.

At activity 17200, a one-dimensional model can be run. The one-dimensional model can comprise a defined set of flows and resistances that are represented without regard to two-dimensional or three-dimensional directionality of airflows in the electric motor. A volumetric flowrate of cooling air at a predetermined location within the electric motor can be determined based upon obtained specification information and/or via an iterative one-dimensional model. The iterative one-dimensional model can determine a volumetric flowrate and/or air pressure determined at each of a plurality of radially distributed longitudinal vents. The iterative one-dimensional model can be executed until a measure of convergence for each volumetric flowrate determined at each radially distributed longitudinal vent is below a predetermined threshold.

At activity 17300, the one-dimensional model can be calibrated. The iterative one-dimensional model can be calibrated based upon flow measurement data from an operating electric motor. The flow measurement data can be obtained from a similar electric motor to the electric motor. The iterative one-dimensional model can be adapted to determine a fan curve based upon the flow measurement data. The iterative one-dimensional model can be usable for both an X-pattern of ventilation and a Z-pattern of ventilation via a single calibration without modeling a three-dimensional air space.

At activity 17400, the calibrated one-dimensional model can be run and can be adapted to provide cooling airflow and/or air pressure estimates in an electric motor having a Z-pattern of ventilation. The cooling airflow and/or air pressure estimates can be determined and/or provided at each of a plurality of predetermined locations in the electric motor having a Z-pattern of ventilation.

At activity 17500, the calibrated one-dimensional model can be run and can be adapted to provide cooling airflow and/or air pressure estimates in an electric motor having a X-pattern of ventilation. The cooling airflow and/or air pressure estimates can be determined and/or provided at each of a plurality of predetermined locations in the electric motor having a X-pattern of ventilation.

The one-dimensional model can determine a volumetric flowrate and/or an air pressure responsive to a change of geometry of a component in a representation of the electric motor.

At activity 17600, estimates of the cooling airflow and/or air pressure estimates can be rendered via an information device. A determined volumetric flowrate of air and a corresponding dynamic air pressure at each of a plurality of radially distributed longitudinal vents in the core of the electric motor can be automatically rendered.

At activity 17700, the electric motor can be constructed and/or provided to a customer. The electric motor can be designed based upon information obtained from the one-dimensional model.

Figure 18:
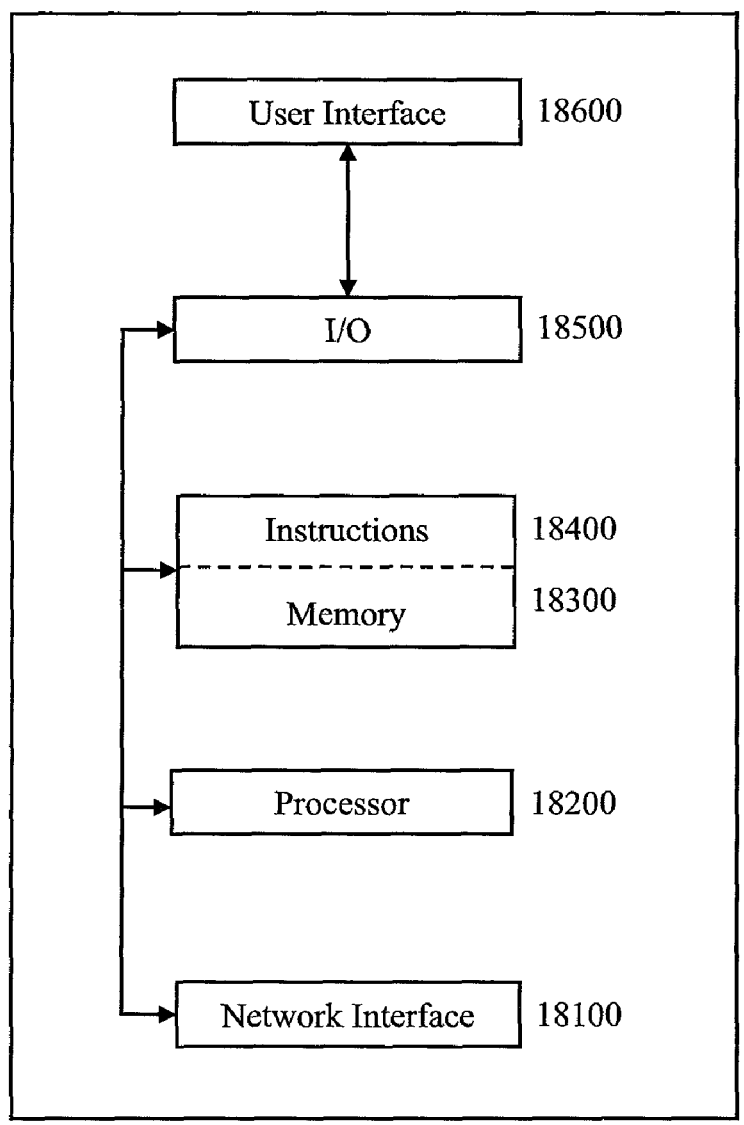
FIG. 18 is a block diagram of an exemplary embodiment for an information device 18000.

FIG. 18 is a block diagram of an exemplary embodiment for an information device 18000. Information device 18000 can comprise any of numerous components, such as for example, one or more network interfaces 18100, one or more processors 18200, one or more memories 18300 containing instructions 18400, one or more input/output (I/O) devices 18500, and/or one or more user interfaces 18600 coupled to I/O device 18500, etc.

In certain exemplary embodiments, via one or more user interfaces 18600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Certain exemplary embodiments can comprise a machine-readable medium comprising machine instructions for activities that can comprise any activity or set of activities comprised by any of methods 13000, 14000, 15000, 16000, and/or 17000. Certain exemplary embodiments can comprise a signal comprising machine instructions for activities that can comprise any activity or set of activities comprised by any of methods 13000, 14000, 15000, 16000, and/or 17000.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
accuracy—correctness.
activity—an action, act, deed, function, step, and/or process and/or a portion thereof.
adapted to—suitable, fit, and/or capable of performing a specified function.
adjacent—in close proximity to, near, next to, and/or adjoining.
air—the earth's atmospheric gas.
airflow—a current of air.
air pressure—a measure of compression of air in a given state relative to a standard state.
air space—a three-dimensional volume in which air can flow.
and/or—either in conjunction with or in alternative to.
apparatus—an appliance or device for a particular purpose.
approximately—about and/or nearly the same as.
associated with—related to.
at least—not less than.
automatically—acting and/or operating in a manner essentially independent of external human influence and/or control. For example, an automatic light switch can turn on upon "seeing" a person in its view, without the person manually operating the light switch.

based upon—determined in consideration of and/or derived from.

below—beneath; in a lower place; and/or less than.

between—in a separating interval and/or intermediate to.

calibrate—to check, adjust, and/or determine by comparison with a standard.

calibration—a checking of an instrument against a reference point or standard.

can—is capable of, in at least some embodiments.

capable—a potential for use.

cause—to bring about, provoke, precipitate, produce, elicit, be the reason for, result in, and/or effect.

change—(v) to cause to be different; (n) the act, process, and/or result of altering or modifying.

characterize—to define, describe, classify, and/or constrain the qualities, characteristics, and/or peculiarities of.

circuit—an electrically conductive pathway and/or a communications connection established across two or more switching devices comprised by a network and between corresponding end systems connected to, but not comprised by the network.

component—a constituent element and/or part.

comprised by—included by.

comprise—to include but not be limited to.

configuration—a physical, logical, and/or logistical arrangement of elements.

convergence—an approach to a limit.

cooling—reducing a temperature of a substance.

core—a portion of a rotor comprising a plurality of thin laminations stacked together to form a long hollow cylinder. The core can include a plurality of windings, each of which is constructed of wound insulated wire, the windings residing in slots in the stacked laminations.

corresponding—related, associated, accompanying, similar in purpose and/or position, conforming in every respect, and/or equivalent and/or agreeing in amount, quantity, magnitude, quality, and/or degree.

data—information represented in a form suitable for processing by an information device.

define—to establish the meaning, relationship, outline, form, and/or structure of; and/or to precisely and/or distinctly describe and/or specify.

degrees Celsius—a unit of temperature. The Celsius temperature scale defines the freezing point of water is 0 degrees, and the boiling point is 100 degrees at standard atmospheric pressure.

design—(n) a purposeful arrangement of parts and/or details. For example, the design of a product and/or process can comprise designing predetermined aspects of the product and/or process; (v) to plan, such as in a manner that comprises the development of a graphic representation.

determine—to obtain, calculate, decide, deduce, establish, and/or ascertain.

device—a machine, manufacture, and/or collection thereof.

diameter—a length of a straight line segment passing through a center of an object and terminating at the periphery thereof.

dimension—an extension in a given direction.

dynamic—1) time-varying. 2) a non-causal entity whose current value and/or current output is dependent on its past and/or future input and/or output.

each—every one of a group considered individually.

electric motor—a motion-imparting device powered by electricity.

energy—usable power.

estimate—(n) a calculated value approximating an actual value; (v) to calculate and/or determine approximately and/or tentatively.

execute—to carry out a computer program and/or one or more instructions.

fan—a machine adapted to move air, typically via rotating vanes.

fan curve—a mathematical, tabular, and/or graphical description of a relationship between a flowrate of a fluid output by a fan and the pressure of that fluid at or within a predetermined vicinity of an outlet of the fan.

flow—a continuous transfer.

for—with a purpose of.

frame size—a designation that relates to a standardized set of motor dimensions that includes one or more of bolt hole size, mounting base dimensions, shaft height, shaft diameter, and shaft length.

from—used to indicate a source.

further—in addition.

geometry—a three-dimensional arrangement.

greater—larger and/or more than.

group—a plurality of determined units.

have—to be identified by.

height—a measurement of the extent of something along a dimension.

horsepower—a unit of rate of doing work that equals approximately 746 watts.

initial—at a beginning.

information—facts, terms, concepts, phrases, expressions, commands, numbers, characters, and/or symbols, etc., that are related to a subject.

Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

inlet area—a total cross-sectional area of cooling air openings located in a plane defined by a face of a rotor end.

iterative—repeatedly.
lack—a particular deficiency or absence.
length—a longest dimension of something and/or the measurement of the extent of something along its greatest dimension.
less than—having a measurably smaller magnitude and/or degree as compared to something else.
location—a place.
machine—a device and/or vehicle adapted to perform at least one task.
machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.
machine-readable—of a form from which an information device can obtain data and/or information.
machine-readable medium—a physical structure from which a machine, such as an information device, computer, microprocessor, and/or controller, etc., can obtain and/or store data, information, and/or instructions.
made—performed.
manufacturing entity—a person, team, role, organization, computer, and/or application that constructs something.
may—is allowed and/or permitted to, in at least some embodiments.
measure—(n) a quantity ascertained by comparison with a standard. (v) to physically sense, and/or determine a value and/or quantity of something relative to a standard.
measurement—a value of a variable, the value determined by manual and/or automatic observation.
method—a process, procedure, and/or collection of related activities for accomplishing something.
model—a mathematical and/or schematic description of an entity and/or system.
more—in greater quantity.
obtain—to receive, get, take possession of, procure, acquire, calculate, determine, and/or compute.
one-dimensional model—a mathematical and/or schematic description of an entity and/or system that considers each fluid flow in terms of an average volumetric flowrate and an average direction at a given location for that flowrate, the description comprising inlet and exit flows and flow resistances.
operating—functioning.
outlet area—a total cross-sectional area of cooling air openings in a circumferential surface of a rotor.
one—a single unit.
output rating—an expected performance capability of doing work.
outside—the space beyond a boundary and/or limit.
pathway—a route along which something moves.
plurality—the state of being plural and/or more than one.
portion—a part, component, section, percentage, ratio, and/or quantity that is less than a larger whole. Can be visually, physically, and/or virtually distinguishable and/or non-distinguishable.
produce—to generate via a physical effort.
predetermined—established in advance.
predetermined threshold—a limit established in advance.
predict—prognosticate regarding a future event.
provide—to furnish, supply, give, convey, send, and/or make available.
radially distributed longitudinal vent—an aperture via which cooling airflows from a central region of a substantially cylindrical electric motor rotor, the aperture defining a an aperture length that is substantially parallel to a longitudinal axis of the electric motor rotor. A flow of air starts in a longitudinal direction and then travels radially to an outer diameter of a core of the electric motor.
rate—to estimate a performance capability.
ratio—a relationship between two quantities expressed as a quotient of one divided by the other.
receive—to gather, take, acquire, obtain, accept, get, and/or have bestowed upon.
regarding—pertaining to.
render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.
representation—an approximation, equivalent, mathematical characterization, rendering, image, and/or likeness of something.
request—(v.) to express a need and/or desire for; to inquire and/or ask for. (n.) that which communicates an expression of desire and/or that which is asked for.
responsive—reacting to an influence and/or impetus.
revolutions per minute—a number of complete rotations about an axis during a time period of one minute.
rise—increase.
rotor—a rotating portion of a machine.
rotor bar—one of a plurality of electrical and magnetically conductive metal pieces that extend between ends of a rotor.
said—when used in a system or device claim, an article indicating a subsequent claim term that has been previously introduced.
selected—a chosen item.
shaft—a long, generally cylindrical bar that is adapted to rotate about a longitudinal axis and to transmit power.
signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

similar—related in appearance and/or structure.

single—existing alone or consisting of one entity.

specification—a description or characterization.

speed—a linear, curvilinear, and/or angular velocity and/or a linear, curvilinear, and/or angular distance traveled during a predetermined time interval.

stator—a stationary part in or about which another part (the rotor) revolves.

substantially—to a considerable, large, and/or great, but not necessarily whole and/or entire, extent and/or degree.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

three-dimensional—definable via coordinates relative to three mutually perpendicular axes.

Totally Enclosed Air-Air Cooled (TEAAC) enclosure—a machine casing that is cooled by circulating the internal air through an air-to-air heat exchanger which, in turn, is cooled by circulating external air. The machine casing is provided with the air-to-air heat exchanger, integral or machine mounted, for cooling the internal air; a fan or fans, integral with the rotor shaft or separate for circulating the internal air; and a fan or fans, integral with the rotor shaft or separate, but external to the enclosing part or parts, for circulating the external air. The housing defined by NEMA MG1 1.26.8.

Totally Enclosed Water to Air Cooled (TEWAC) enclosure—a totally enclosed machine which is cooled by circulating air which, in turn, is cooled by circulating water. The enclosure is provided with a water-cooled heat exchanger, integral and/or machine mounted, for cooling internal air. The enclosure is proved with a fan or fans, integral with the rotor shaft or separate for circulating the internal air.

until—up to a time that.

usable—adapted to be used.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

vent—an aperture through which cooling airflows.

via—by way of and/or utilizing.

volumetric flowrate—a measure of a magnitude of fluid transferred in a predetermined time interval, such as an amount of fluid moved across a predetermined plane in a given time period, the plane oriented substantially perpendicular to an average direction of the fluid.

Weather Protected type II (WPII) enclosure—a guarded machine housing that comprises ventilating passages so constructed as to resist entrance of rain, snow, and/or air-borne particles to electric machine parts. Ventilating passages at both intake and discharge are so arranged that high-velocity air and air borne particles blown into the machine by storms or high winds can be discharged without entering the internal ventilating passages leading directly to the electric parts of the machine itself. The normal path of ventilating air which enters electric parts of the machine are so arranged by baffling or separate housings as to provide at least three abrupt changes in direction, none of which is less than 90 degrees. In addition, an area of low velocity not exceeding 600 feet per minute is provided in an intake air path to minimize the possibility of moisture or dirt being carried into the electric parts of the machine. The housing defined by NEMA MG1 1.25.8.

wherein—in regard to which; and/or in addition to.

width—a measurement of the extent of something along a dimension.

without—not accompanied by.

X-pattern of ventilation—a predetermined arrangement adapted to channel cooling air, the predetermined arrangement comprising a set of baffles adapted to channel the cooling air from an electric motor cooling fan to enter a rotor of the electric motor on each end of the rotor, the set of baffles adapted to channel the cooling air to exit the rotor via a plurality of openings defined by a circumferential face of the rotor.

Z-pattern of ventilation—a predetermined arrangement adapted to channel cooling air, the predetermined arrangement comprising a set of baffles adapted to channel the cooling air from the electric motor cooling fan to enter the rotor of the electric motor at a first end of the machine and travel axially and radially through vents in the rotor and stator core, the set of baffles adapted to channel the cooling air, via the plurality of openings defined by a circumferential face of the rotor, to exit said the via a second end of the machine, wherein a fan impelling the cooling air is on the second end of the machine.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:
    determining a volumetric flow rate based on specification information for an electric motor, wherein the volumetric flow rate is determined via an iterative one-dimensional model;
    calibrating said iterative one-dimensional model based upon flow measurement data from an operating electric motor to provide a calibrated one-dimensional model;
    determining a fan curve via said iterative one-dimensional model that is based upon said flow measurement data and wherein said calibrated one-dimensional model models an X pattern of ventilation and a Z pattern of ventilation via a single calibration without modeling a three-dimensional air space wherein the Z pattern of ventilation includes cooling air entering the electric motor at an air inlet adjacent a first side of an electric motor rotor and exiting via an air outlet adjacent a second side of the rotor that is opposite the first side; and
    automatically rendering a determined volumetric flow rate of air and a corresponding dynamic air pressure at each of a plurality of radially distributed longitudinal vents in a core of an electric motor based on the calibrated one-dimensional model wherein determining a volumetric flow rate and a fan curve, calibrating the one-dimensional model and automatically rendering are performed by using a computer.

2. The method of claim 1, further comprising obtaining said specification information.

3. The method of claim 1, further comprising providing a user interface adapted to request said specification information.

4. The method of claim 1, wherein said iterative one-dimensional model is executed until a measure of convergence for each volumetric flow rate determined at each radially distributed longitudinal vent is below a predetermined threshold.

5. The method of claim 1, wherein said specification information comprises dimensional information of said electric motor.

6. The method of claim 1, wherein said specification information comprises configuration information of said electric motor.

7. The method of claim 1, wherein said specification information comprises fan dimensions and configuration information associated with said electric motor.

8. The method of claim 1, wherein said specification information comprises a predetermined threshold of accuracy associated with said volumetric flow rate.

9. The method of claim 1, wherein said specification information comprises an initial airflow estimate at a predetermined location in said electric motor.

10. The method of claim 1, wherein said volumetric flow rate is determined responsive to a change of geometry of a component in a representation of said electric motor.

11. The method of claim 1, wherein said flow measurement data is obtained from a similar electric motor to said electric motor.

12. The method of claim 1, wherein said electric motor has a Weather Protected type II (WPII) enclosure.

13. The method of claim 1, wherein said electric motor has a Totally Enclosed Air to Air Cooled (TEAAC) enclosure.

14. The method of claim 1, wherein said electric motor has a Totally Enclosed Water to Air Cooled (TEWAC) enclosure.

15. A non-transitory computer readable medium having program instructions tangibly stored thereon executable by a processor to perform a method comprising:

determining a volumetric flow rate based on specification information for an electric motor, wherein the volumetric flow rate is determined via an iterative one-dimensional model;

calibrating said iterative one-dimensional model based upon flow measurement data from an operating electric motor to provide a calibrated one-dimensional model;

determining a fan curve via said iterative one-dimensional model that is based upon said flow measurement data and wherein said calibrated one-dimensional model models an X pattern of ventilation and a Z pattern of ventilation via a single calibration without modeling a three-dimensional air space wherein the Z pattern of ventilation includes cooling air entering the electric motor at an air inlet adjacent a first side of an electric motor rotor and exiting via an air outlet adjacent a second side of the rotor that is opposite the first side; and automatically rendering a determined volumetric flow rate of air and a corresponding dynamic air pressure at each of a plurality of radially distributed longitudinal vents in a core of an electric motor based on the calibrated one-dimensional model wherein determining a volumetric flow rate and a fan curve, calibrating the one-dimensional model and automatically rendering are performed by using a computer.

* * * * *